Figure 1:
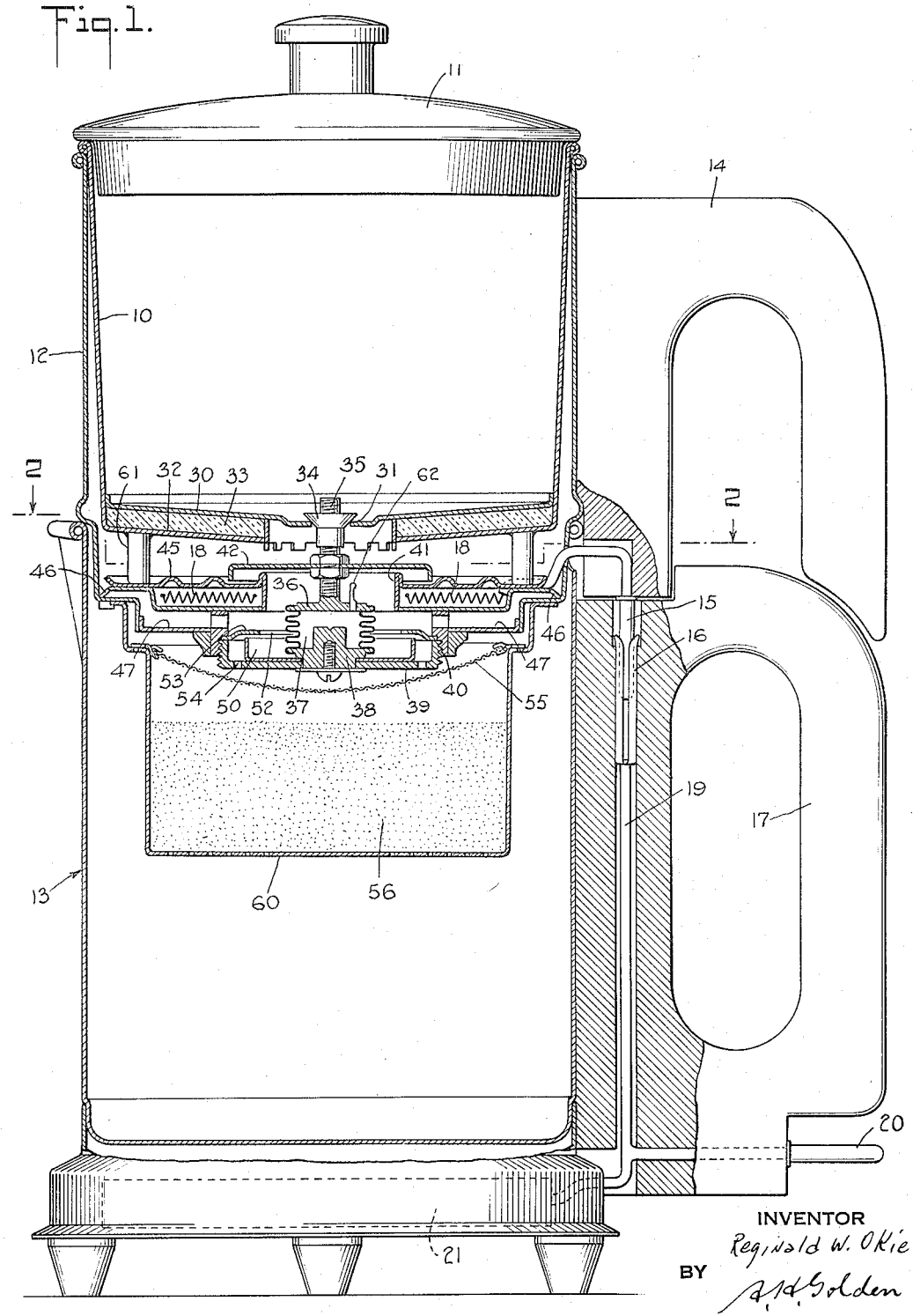

Nov. 29, 1955  R. W. OKIE  2,725,008
COFFEE MAKER

Filed Jan. 4, 1951  2 Sheets-Sheet 1

INVENTOR
Reginald W. Okie
BY
A. H. Golden
ATTORNEY

2,725,008

COFFEE MAKER

Reginald W. Okie, Greenwich, Conn.

Application January 4, 1951, Serial No. 204,371

8 Claims. (Cl. 99—283)

This invention relates to a coffee maker, and more particularly to an automatic coffee maker in which heated water is allowed to pass over coffee grains into a final dispensing container.

In coffee makers of the particular class, it is customary to heat electrically a quantity of water and then allow the water to flow over ground coffee, the essence of the coffee being taken by the water downwardly into a dispenser. In the prior art, coffee makers of this type have been provided with means for heating water and then allowing the water to flow automatically downwardly over ground coffee into a dispensing container. It is quite obvious that in a coffee maker so constructed, there will be a tendency for the water to cool rather considerably during its movement from contact with the heating element toward the ground coffee. In an earlier application, Serial No. 172,103, filed July 5, 1950, for the purpose of controlling the temperature of the water so that it contacts the ground coffee at a particular desired temperature, I provide thermostatically controlled means for preventing admission of the water to the ground coffee unless the water is at a predetermined temperature. Through the particular arrangement, it is absolutely impossible for the water to enter that chamber in which the ground coffee is contained, unless the temperature of the water just prior to contacting the ground coffee is at a particular desired temperature.

In this prior application, through the arrangement described, extremely effective results are obtained, but I do require two thermostats and two valves. I have now conceived a construction, to be described in this application, in which extremely effective results are obtained through the utilization of but a single thermostat. Here I recognize that single thermostat constructions are now known in the art, but such single thermostat constructions do not have an arrangement whereby the thermostat is subject to effective influence of that water that has left contact with the heating element, as well as to the influence of the heating element independently of the water.

Thus, in the invention to be described by me, the water is allowed to flow from a water container, upon the temperature in the heating chamber reaching a predetermined degree, due to the action of a heating element contained in that chamber. The water first flows into contact with the heating element, and upon leaving the heating element, does not flow to the coffee, but rather flows into direct physical contact with the thermostat, and only thereafter toward the ground coffee. If the water thus contacting the thermostat has not held a desired degree of heat, it obviously affects the thermostat in such fashion as to shut off the flow of water. Therefore, in effect, I obtain the flow of a series of small increments of water from the water containing chamber to the coffee, very much in the same manner as in my earlier application. However, there is the extremely desirable elimination of one thermostat and one valve found in my earlier application, with no appreciable decrease in operating efficiency.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Figure 2:
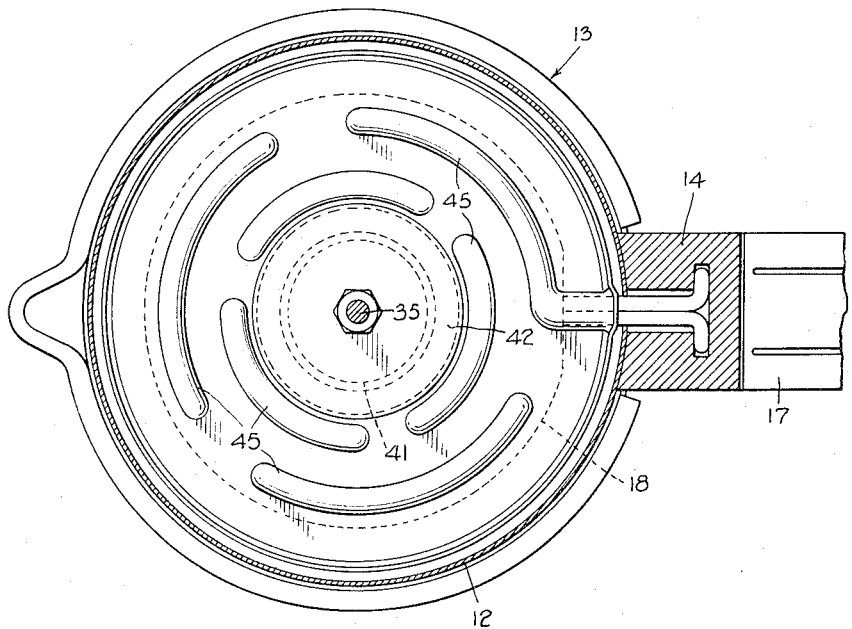

Referring now to the drawings, Fig. 1 is a vertical section of a coffee maker embodying my invention. Fig. 2 is a section along lines 2—2 of Fig. 1.

Referring now more particularly to the drawings, reference numeral 10 indicates an upper water container adapted to be covered by a cover 11, and to be nested within an open chamber formed by a sheet metal outer housing 12. The housing 12 is adapted to hold or contain therein all of the active elements of what I term the coffee making assembly. Moreover, the outer housing 12 is adapted as a unit to be assembled to the coffee dispenser designated generally by reference numeral 13.

It is respectfully indicated at this point that the general construction of the coffee maker herein to be shown and described is the same as that of my earlier application. This is particularly true of the electrical circuits, the arrangement of the handles, etc. Therefore, in describing my invention, I will not refer to those details of construction that are best shown in my earlier application, but shall describe rather those particular parts that form the particular features wherein the new construction of this application differs from the construction of my first application, and which features are hereinafter claimed.

For handling the sheet metal outer housing 12, and therefore the entire coffee making assembly, there is secured thereto a handle 14 made from some suitable plastic material. This handle 14 carries current conducting prongs 15, it being the function of the prongs 15 to fit into current conducting sockets 16 carried by a handle member 17 fixed to the coffee dispenser 13. When the prongs 15 are inserted in the sockets 16, it is obvious that current will then flow from the sockets 16 into the prongs 15 and toward a heating element 18 made a part of the coffee making assembly. The sockets 16 are through wires 19 in contact with a pair of contact members 20 by which current is fed to the entire coffee maker. The wires 19 are also in electrical contact with a heating element 21 of the coffee dispenser, this heating element being utilized for maintaining at a particular temperature the brewed coffee that is fed to the coffee dispenser from the coffee making assembly.

It is obvious that when the coffee maker is assembled as shown in Fig. 1, the parts thereof will be maintained in the position illustrated for the making of the coffee in a manner to be described presently. When the coffee is made, the handle 14 and the housing 12 are moved upwardly, bringing the prongs 15 out of the electric sockets 16. The cover 11 may then be applied to the dispenser 13, and coffee may be poured from the dispenser in the usual manner that those skilled in the art fully appreciate. At this point it will be well to add that in describing the invention insofar as I have, and in the further description that follows, the reference numerals applied to the several parts are the same reference numerals that are applied to the same parts in my earlier application.

The upper water container 10 is equipped with an intermediate bottom plate 30 formed with a valve opening 31 in a depressed central portion thereof. The container itself has also a lower bottom plate 32 and between the intermediate bottom plate 30 and the lower bottom plate 32, there is placed insulation 33, it being the function of this insulation 33 to prevent the heating by element 18 of the water in the upper water container 10. A valve body 34 is adapted for movement relatively to the valve opening 31, being secured for this purpose to a screw stud 35 that is formed as an integral part of a plate 36 forming the upper part of a thermostat 37 of Sylphon bellows construction. The lower plate of the Sylphon bellows type thermostat is designated by reference numeral 38 and it is secured through a screw 40 to a bottom surface member 39 of the metal outer housing 12. The manner of fabrication of this outer housing 12 is not of any particular importance, it being merely necessary that it have vertical sides, and then approximately that configuration that leads to the bottom part 39. I actually show the outer housing 12 fabricated from a series of parts suitably soldered or welded to form a continuous body, with the bottom part 39 secured thereto through screw threads 40, this being the preferred arrangement only.

Secured within the outer housing 12 is, of course, the heating element 18 earlier described, this heating element being elevated above the thermostat 37, and being formed with a central opening 41 through which may pass the stud 35 extending from the upper plate 36 of the Sylphon bellows thermostat 37. Baffle plate 42 is secured to the stud 35, it being the purpose of this plate to prevent the effective flow of water from the upper surface of the heating element 18 toward the ground coffee through central opening 41. Thus, it is desirable that the water entering the heating chamber be applied to the upper surface of the heating element 18, former preferably with baffle ridges 45 to slow down the movement of the water. The water will move toward the outer periphery of the heating element 18 and then downwardly through a series of openings 46 so as to flow onto a surface 47. It will be particularly noted that when the thermostat is in a position to close the opening at 31 through the valve 34, the baffle plate 42 will almost entirely prevent the movement of any water whatsoever through the central opening 41 of the heating element 18. Even when lifted somewhat, the baffle plate 42 will still prevent the flow of any appreciable quantity of water through said central opening.

A cup-like housing member 50 surrounds the bottom of the thermostat 37, being quite shallow so that a relatively small quantity of water will fill the said housing. Any water that moves into contact with the surface 47, is adapted to flow through an opening 52 in a plate 53 toward the cup-like housing 50. Any water overflowing the cup-like housing 50 may, through a series of openings 54, flow downwardly through a screen 55 and into contact with ground coffee 56 contained in a coffee basket 60. The basket 60 may be secured in position to the outer housing 12 in a manner fully set forth in my earlier application.

Prior to describing the complete operation of my invention, it will be well to note that the water container 10 is formed with a series of spacer lugs 61 through which it rests on the upper ridged surface of the heating element 18. It will also be well to note that the upper plate 36 of the Sylphon bellows thermostat is equipped with a limit finger 62 adapted to limit the upward movement of the thermostat, as those skilled in the art will fully appreciate.

In the operation of my invention, water is placed in the container 10 while ground coffee is placed in the container 60, all of the parts being then assembled as illustrated in Fig. 1. With the parts assembled as shown, the valve body 34 will hold the valve passage 31 closed, the water head acting on the valve body 34 to assist it in its functioning. Heating element 18 is activated, and the first effect of the heat is to expand the thermostat so as to move the valve body 34 upwardly to open valve passage 31. Water will then flow immediately onto the deflector 42 and then to the upper surface of the heating element 18, there guided and slowed by the several ridges 45. The water will flow toward the periphery of the heating element as it is being heated, and then move downwardly through the openings 46 onto the plate 47 and then through the central opening 52 of plate 53 into the cup 50. If this water has cooled to any considerable degree below the desired setting of the thermostat, the valve 34 will immediately close and will prevent the flow of any additional water. It is important to note that the first water to affect the thermostat will be the first water reaching the thermostat, and that all of the water must flow into the cup 50 although it may be possible to arrange so that only a part of the water should so flow.

With the thermostat now shutting off the flow of water, the heating element will continue to apply heat to the chamber, and this heat will gradually raise the temperature of the water and the thermostat to the point where the cooling effect of the water on the thermostat is overcome, whereupon the valve will open once again, admitting additional water for flow toward the heating element. So long as this water is at a desired temperature, it will flow through the cup-like housing 50 and through the openings 54 without affecting the valve 34 through the cooling of the thermostat. However, should the water temperature drop below a predetermined degree, the thermostat will operate to close once again the valve at 34—31.

I have found, through actual operation of my coffee maker, that it will operate in a very similar manner to that of the coffee maker of my earlier application despite that fact that I use but one valve and one thermostat. I have further found that I obtain the flow of a series of small increments of water, at least at the beginning of the operation of the coffee maker, and that the temperature of the water is fully and adequately controlled so that the water reaching the ground coffee is at a desired temperature for the making of excellent coffee, and this I attribute to the particular arrangement of the parts whereby the thermostat is immediately and effectively controlled by the water that must flow to the ground coffee, and that through the particular relationship of the thermostat to this flowing water and to the heating element, the results obtained are inherent in the construction.

I now claim:

1. In a coffee maker of the class described, an upper water container, a heating chamber below said water container having a heating element therein, said heating element having an opening therethrough, a coffee holder below said heating chamber, a thermostat positioned under the opening of said heating element and exposed to the heat thereof and in the path of the water flowing downwardly through said opening of the heating element, a flow valve for said water container, means controlled by said thermostat extending to said flow valve whereby when said heating element is actuated said valve is opened by said thermostat to allow flow of water downwardly into said heating chamber, and means for guiding substantially all the water flowing over said heating element through said opening for flow downwardly into contact with said thermostat just prior to flowing into said coffee holder.

2. In a coffee maker of the class described, an upper water container, a heating chamber below said water container having a heating element therein, a coffee holder below said seating chamber, a thermostat in said heating chamber below said heating element exposed to the heat of said heating element, a flow valve for said water container, means extending from said thermostat through an opening in said heating element for opening said valve when said heating element is actuated whereby to allow flow of water into said heating chamber and over said heating element, a cup-like housing for said thermostat, and means for guiding the water downwardly from said heating element into said housing, said water overflowing the rim of said cup-like housing and then entering said coffee holder.

3. In a coffee maker of the class described, an upper water container, a heating chamber below said water container having a heating element therein, a coffee holder below said heating chamber, a Sylphon bellows thermostat in said heating chamber having at least a part thereof below said heating element, means securing the lower end of said bellows against movement relatively to said heating chamber, a cup-like housing in which the said lower end of said bellows is housed, a flow valve for said water container controlled by said thermostat whereby when said heating element is actuated, said valve is opened by said thermostat to allow flow of water into said heating chamber, means guiding said water into contact with said heating element and additional guide means for guiding said water into said thermostat housing with said water overflowing said housing in its movement to said coffee holder.

4. In a coffee maker of the class described, an upper water container, a heating chamber below said water container having a heating element therein, a coffee holder below said heating chamber, a Sylphon bellows thermostat in said heating chamber below said heating element, means securing the lower end of said bellows against movement relatively to said heating chamber, a cup-like housing in which the lower end of said thermostat is housed, a vertically moving flow valve for an opening of said water container fixed to said thermostat whereby when said heating element is actuated, said valve is opened by said thermostat to allow flow of water into said heating chamber, guide means effecting the flow of the water into contact with the upper surface of said heating element, passage means whereby water flows from said upper surface to said cup-like housing, said housing being shallow with the water overflowing the rim thereof into said coffee holder.

5. In a coffee maker of the class described, an upper water container, a heating chamber below said water container having a heating element therein, said heating element having a vertical central opening therethrough, a coffee holder below said heating chamber, said water container having a bottom formed with a valve opening, a flow valve for said water container opening, a thermostat positioned in axial alignment with the central opening of said heating element and exposed to the heat thereof and in the path of the water flowing downwardly through said central opening of the heating element, means of connection between said valve and thermostat passing through said central opening whereby when said heating element is actuated, said valve is opened by said thermostat to allow flow of water into said heating chamber and over said heating element to be heated thereby, means employing gravity to direct the flow of water from contact with said heating element toward said thermostat to cool said thermostat and thereby urge said valve back toward closed position if said water cools said thermostat a predetermined degree, said water flowing from said thermostat to said coffee holder.

6. In a coffee maker of the class described, an upper water container, a heating chamber below said water container having a heating element therein, said heating element having a vertical central opening therethrough, a coffee holder below said heating chamber, said water container having a bottom formed with a valve opening, a flow valve for said water container opening, a bellows thermostat positioned in axial alignment with the central opening of said heating element exposed to the heat thereof and in the path of the water flowing downwardly through said central opening of the heating element, means of connection between said valve and the upper end of said thermostat whereby when said heating element is actuated, said valve is opened by said thermostat to allow flow of water into said heating chamber and over said heating element to be heated thereby, and means employing gravity to direct the flow of substantially all of the water from contact with said heating element into contact with said thermostat to cool said thermosat and thereby urge said valve back toward closed position if said water cools a predetermined degree, said water flowing from said thermostat to said coffee holder.

7. In a coffee maker of the class described, an upper water container, a heating chamber below said water container having a heating element therein formed with a vertical opening, a coffee holder below said heating chamber, a thermostat in alignment with the opening of said heating element exposed to the heat of said heating element and in the path of the water flowing downwardly through said opening of the heating element, a flow valve for said water container, means controlled by said thermostat extending to said flow valve whereby when said heating element is actuated, said valve is opened by said thermostat to allow flow of water into said heating chamber and over said heating element, means for guiding the water downwardly from said heating element for contact with said thermostat prior to flow into said coffee holder, and passage means for the flow of the water from said thermostat to said coffee holder.

8. In a coffee maker of the class described, an upper water container, a heating chamber below said water container, a heating element therein, said heating element having an opening therethrough, a coffee holder below said heating chamber, a Sylphon bellows thermostat positioned in alignment with the opening of said heating element and in the path of water flowing downwardly through said opening of the heating element, means securing the lower end of said bellows against movement relative to said heating chamber, a flow valve for said water container, means controlled by said thermostat extending to said flow valve whereby when said heating element is actuated, said valve is opened by said thermostat to allow flow of water into said heating chamber, means guiding said water into contact with said heating element, and guide means for guiding said water to said coffee holder, said guide means including means whereby said water moves to said coffee holder after contact with said thermostat.

References Cited in the file of this patent

UNITED STATES PATENTS

| | | |
|---|---|---|
| 1,813,646 | Turkenton | July 7, 1931 |
| 1,916,369 | Harpster | July 4, 1933 |
| 2,018,695 | Wilcox | Oct. 29, 1935 |
| 2,029,596 | Smith | Feb. 4, 1936 |
| 2,176,081 | Kise | Oct. 17, 1939 |
| 2,215,837 | Pinckney | Sept. 24, 1940 |
| 2,230,304 | Locke | Feb. 4, 1941 |
| 2,292,853 | Wilcox | Aug. 11, 1942 |
| 2,306,921 | Wilcox | Dec. 29, 1942 |
| 2,498,386 | Alexander | Feb. 21, 1950 |